Dec. 7, 1971  T. H. JENSEN  3,625,025
METHOD AND DEVICE FOR FORMING GLASS FIBERS
Filed Nov. 29, 1968  2 Sheets-Sheet 1
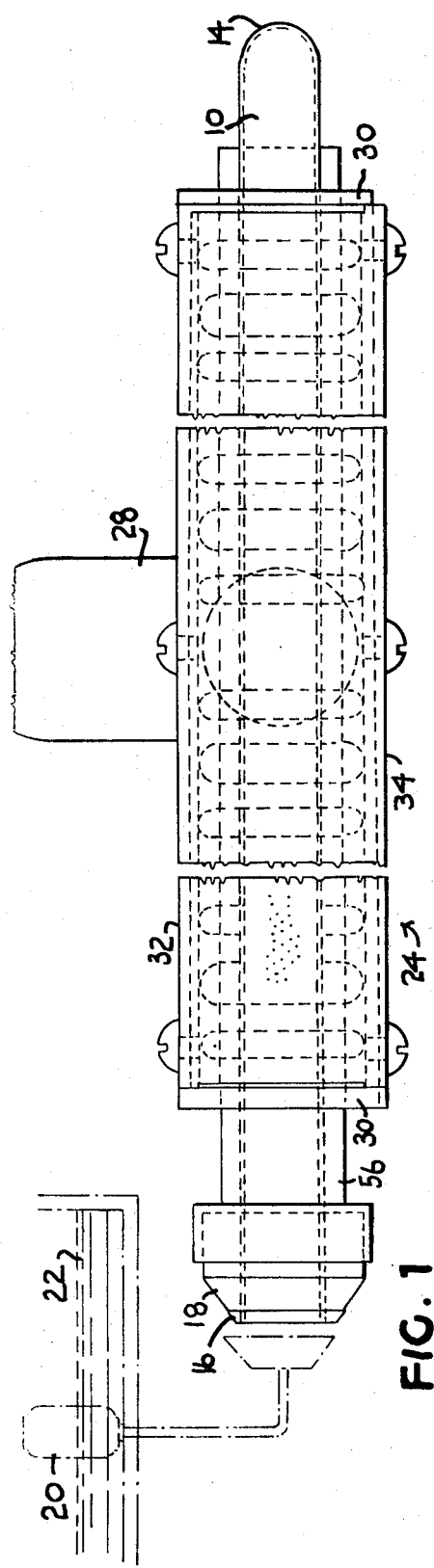
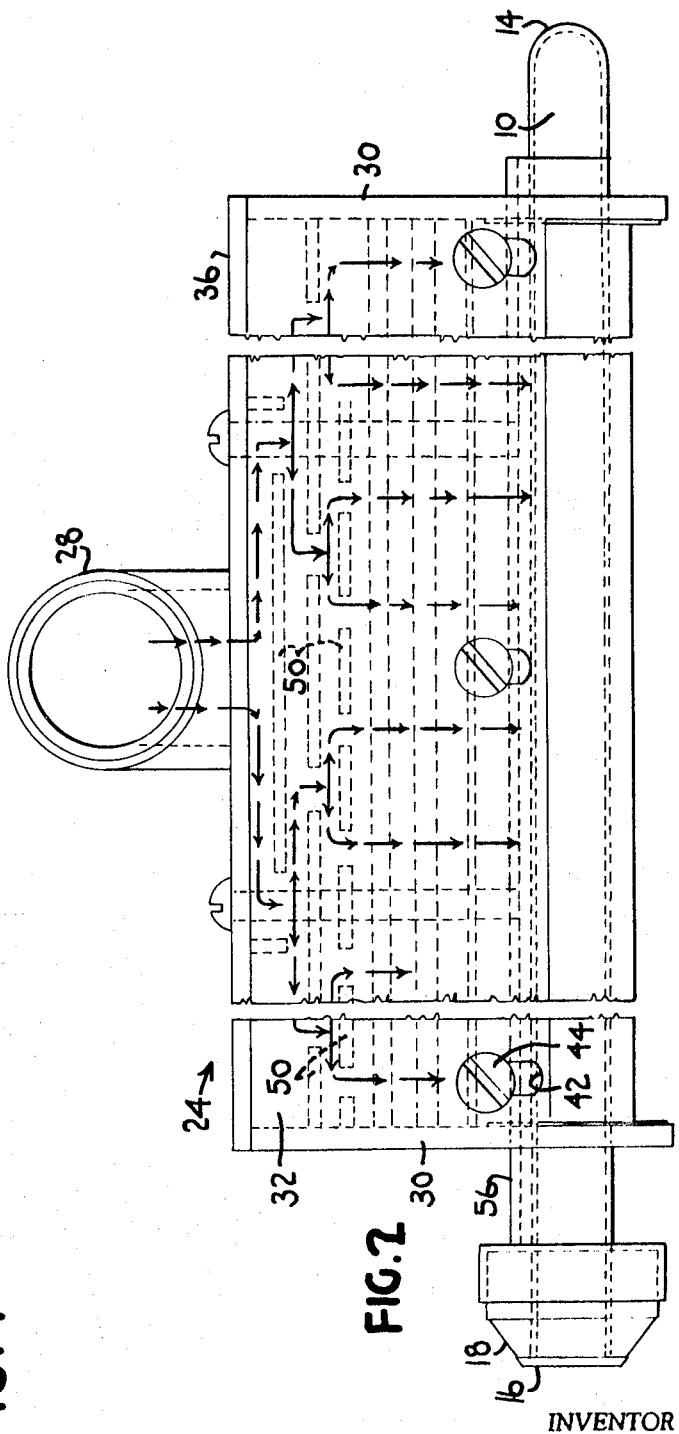
INVENTOR
THOMAS H. JENSEN
BY Chisholm and Spencer
ATTORNEYS 3,625,025
METHOD AND DEVICE FOR FORMING GLASS FIBERS
Thomas H. Jensen, Murrysville, Pa., assignor to PPG Industries, Inc., Pittsburgh, Pa.
Filed Nov. 29, 1968, Ser. No. 779,934
Int. Cl. C03b 37/02
U.S. Cl. 65—2                6 Claims

ABSTRACT OF THE DISCLOSURE

A glass fiberizing device comprises a tubular member having a plurality of orifices therein for extruding steams of glass delivered to the member under pressure. Cooling air is directed across the orifice portion of the member in a direction substantially normal to the direction of glass flow therefrom to prevent flooding of the orifice portion while the remainder of the member is shielded and insulated from air cooling.

BACKGROUND OF THE INVENTION

Figure 3:
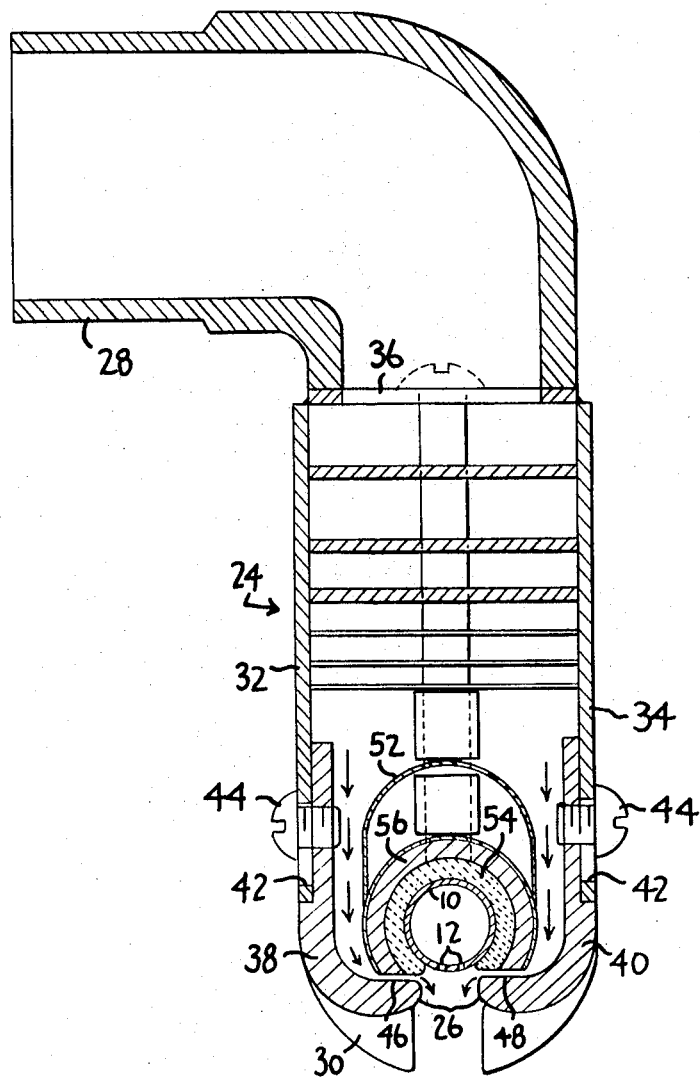

In the conventional fiber glass producing arrangement, molten glass is delivered to an electrically heated bushing which includes a plurality of tips having orifices therethrough for the passage of glass streams. The glass streams are attenuated into fibers which are grouped together as a strand and collected as a package. Generally the bushings are constructed of an alloy, such as 90 percent platinum and 10 percent rhodium. The tips are painstakingly built up by dropping molten alloy onto a bushing plate. The built-up alloy must then be drilled for the orifices. As can be readily seen, there is a serious limitation on the number of orifices in a given space.

Another and later approach is to drill small, closely spaced holes in a metal pipe and deliver molten glass of reasonably high quality under pressure to the pipe, so as to extrude glass through the holes. It has been found that the density of the holes per unit area of pipe far exceeds the density of tips for a like area of a conventional bushing. The cost of an orifice tube, such as just described, is considerably less than the cost of a conventional bushing. It is customary to at least partially shroud the tube and deliver a controlled atmosphere to the shroud to envelop the tube and be discharged near the holes to protect the tube against oxidization.

Also it has been found that attenuating glass filaments from very small orifices produces less tension in the filament due to the forces of viscous deformation than does a larger orifice producing an equivalent filament at comparable speeds.

In summary, therefore, small, closely spaced orifices provide a means of producing small diameter filaments and larger filament count products than is possible with conventional bushings.

THE INVENTION

The present invention is an improvement in the orifice tube construction and involves an improved method of producing fibers therefrom.

The orifice tube in the present inventive arrangement is shrouded by a manifold to which cooling air is delivered. The shroud partially covers the orifice tube and terminates at an opening, the edges of which are slightly spaced from the orifice tube for the passage of cooling air, which cooling air functions to cool the fibers being formed and to insure stable attenuation of the fibers. Air is blown across the holes and from opposing sides to eventually follow the streams of glass and the resultant fibers formed therefrom.

In order to protect the orifice tube from rupture because of the relatively high pressure being exerted thereon by the glass feed, a shield tube partially surrounds the tube, being separated by an insulating material which serves to isolate the tube from cooling air directed thereagainst. An air shield over the shield tube further assists the shield tube in diffusing the cooling air, so that cooling of the orifice tube is avoided. With such structure, variation in cooling air, flow and temperature have substantially no effect on the temperature of the orifice tube. In order to diffuse the intake air and distribute the air along the orifice tube length, diffusing screens are located between the supply tube and the assembly of orifice tube, shield tube and air shield and within the manifold.

THE DRAWINGS

FIG. 1 is a front view of an orifice tube assembly according to this invention;
FIG. 2 is an elevation view of the assembly of FIG. 1; and
FIG. 3 is a central sectional view of the assembly of FIG. 1.

THE PREFERRED EMBODIMENT

The fiberizing device of this invention includes an orifice tube 10 generally made of platinum or platinum alloy with a plurality of holes or orifices 12 in its wall arranged in a closely spaced array. One end of the tube 10 is closed as at 14 while the other end is flanged, as at 16, to seal with a conical flange 18. The flange 18 is made of a ceramic and mates with a complementary shaped member on a supply conduit (as indicated in broken lines) from a pressurizing device 20 which pressurizes molten glass from a source 22 to the tube 10. The tube 10 is heated by passing an electric current therethrough and the connections to a source of electrical energy can be made in any desirable manner, so long as such does not interfere with the fiber forming procedure.

A slotted manifold 24 receives the tube 10 such that the edges of its slot 26 flanks the array of holes 12. The manifold 24 is connected by an inlet pipe 28 to a source of cooling air (not shown).

The manifold 24 is constructed of end walls 30 shaped to receive portions of the tube 10, side walls 32, 34, and a top wall 36. The slot 26 is defined by shroud members 38, 40 curved along one length. The walls 32, 34 are slotted at 42 to receive set screws 44 threaded into the respective shroud members 38, 40. This connection permits adjustment of the shroud members relative to the tube 10 and the dimension of the spaces 46, 48 to be adjusted. The spaces 46, 48 permit passage of cooling air across the orifice tube 10 in the vicinity of the holes 12.

In order to distribute the cooling air along the length of the tube 10 (as indicated by the arrows in FIG. 2), a plurality of distributing members or screens 50 is provided within the shroud.

Inasmuch as the glass delivered to the tube 10 is molten and must be maintained molten, so as to be extruded through the holes or orifices 12, the tube 10 cannot be unduly chilled. To prevent chilling of the tube 10, an air shield 52 is built into the assembly. Also insulating material 54 partially surrounds the tube 10 at least to the extent that it is shrouded.

Additionally, the material of the tube 10 because of the desired properties, i.e., non-wettability with glass and of such composition to not contaminate the glass, can be easily distorted under the operating conditions. Thus a rigid shield tube 56 is located within the air shield 52 and over the insulation 54.

A typical orifice tube 7/16 inch outside diameter is approximately 8 inches to 12 inches in length. The width of the slot formed by the shroud is approximately 5/16 inch. The manifold including the end walls is from 6¼ inches to 10¼ inches long, depending upon the length of the tube. In a space less than the width of the slot, and approximately 7½ inches long (for a tube 12 inches long), 800 or more, .005 to .020 inch diameter holes or orifices are drilled. From each hole or orifice a fiber is produced. Air to the manifold is delivered under a pressure of approximately 4 ounces per square inch and at a temperature of approximately 68° F.

OPERATION

In operation glass is delivered under pressure up to several hundred p.s.i. to the orifice tube 10 and is subsequently extruded through the orifices of the tube. Without any cooling air whatsoever the extruded glass will generally flood out forming a gob of glass extending over the orifice array. A source of constant low pressure air is then introduced at inlet 28 which subsequently flows through the series of distributing baffles 50 and screens and exits from the slots 46 and 48 in a uniform fashion along the length of the orifice tube. The cooling air then cools the glass and causes the glass to separate into individual streams issuing from each of the orifices. After separation has been achieved, a very small amount of cooling air is then required to maintain separation and insures stable attenuation of the filaments.

Separation of the glass into discrete filaments occurs when a proper relationship between viscosity, and the velocity gradient existing in the glass at the wall of the orifice is reached for a given wettability characteristic of the orifice tube material. Generally the lower the wettability tendency, the lower the velocity gradient and/or the viscosity can be before flooding occurs, thus enhancing the capability of the process. Presently various platinum-rhodium-gold alloys are capable of producing the desired characteristics.

I claim:
1. A fiberizing assembly for producing fibers from molten glass comprising,
  an elongated hollow member connected to a source of molten glass and having an array of orifices aligned in a portion of its wall for the passage therethrough of streams of said molten glass to be formed into fibers,
  means for delivering pressurized, cooling air,
  a manifold partially surrounding said member connected to the means for delivering the cooling air, said manifold having an elongated opening at least coextensive with said array of orifices and positioned closely adjacent the porton of said wall having said orifices therein with a relatively narrow gap between said member and said manifold for the passage of said cooling air said manifold being so shaped that cooling air exiting therefrom flows substantially across said orifice array, and
  insulating material partially surrounding said member and disposed within said manifold to protect said member from cooling air within said manifold.

2. An assembly as recited in claim 1 wherein said hollow member is tubular in section and said array of orifices is disposed on one side along the length thereof permitting said insulating material to substantially surround said tubular member along its length.

3. An assembly as recited in claim 2 further including a shield tube surrounding that portion of said member free of said array of orifices to insure the rigidity of said member.

4. An assembly as recited in claim 3 in which said insulating material is positioned between said shield tube and said tubular member.

5. An assembly as recited in claim 1 further including diffusing screens located between said source of cooling air and said tubular member to distribute said cooling air substantially along the length of said manifold and the tubular member therein.

6. A method of producing glass fibers which comprises,
  providing a source of molten glass,
  delivering molten glass under pressure from said source to a fiberizing device which includes a tubular member having an array of relatively closely spaced orifices therein,
  maintaining the glass molten within said tubular member by insulating said tubular member from cooling air,
  extruding streams of molten glass through said orifices,
  discharging cooling air substantially across said array of orifices to cool said streams, and
  attenuating said streams into fibers which may be grouped together as a strand.

References Cited

UNITED STATES PATENTS

| | | | |
|---|---|---|---|
| 3,288,581 | 11/1966 | Schweppe | 65—2 |
| 3,304,163 | 2/1967 | Holschlag | 65—2 X |
| 3,334,981 | 8/1967 | Glaser | 65—11 |
| 3,446,149 | 5/1969 | Amos et al. | |

S. LEON BASHORE, Primary Examiner

R. L. LINDSAY, Jr., Assistant Examiner

U.S. Cl. X.R.

65—12